United States Patent [19]

Koyama

[11] Patent Number: 5,546,373
[45] Date of Patent: Aug. 13, 1996

[54] OPTICAL RECORDING AND/OR REPRODUCING APPARATUS INCLUDING A TWO PRISM BEAM SPLITTER FOR SIZE REDUCTION

[75] Inventor: Osamu Koyama, Yokohama, Japan

[73] Assignee: Canon Kabushiki Kaisha, Tokyo, Japan

[21] Appl. No.: 317,538

[22] Filed: Oct. 4, 1994

[30] Foreign Application Priority Data

Oct. 6, 1993 [JP] Japan .................................. 5-250640

[51] Int. Cl.⁶ ............................. G11B 7/135; G11B 11/10
[52] U.S. Cl. ......................... 369/120; 369/112; 369/110; 369/116; 359/638
[58] Field of Search ...................... 369/110, 112, 369/13, 120, 44.23, 44.14, 44.37, 116; 359/900, 638

[56] References Cited

U.S. PATENT DOCUMENTS

| | | | |
|---|---|---|---|
| 4,803,579 | 2/1989 | Koyama | 360/114 |
| 4,953,124 | 8/1990 | Koyama | 365/122 |
| 5,013,136 | 5/1991 | Whitehead et al. | 359/900 |
| 5,029,261 | 7/1991 | Koyama et al. | 250/201.5 |
| 5,070,493 | 12/1991 | Marshall et al. | 369/112 |
| 5,272,685 | 12/1993 | Ando | 369/112 |
| 5,293,371 | 3/1994 | Koyama | 369/110 |
| 5,293,569 | 3/1994 | Koyama | 369/112 |
| 5,337,300 | 8/1994 | Takishima et al. | 369/112 |
| 5,347,503 | 9/1994 | Koyama et al. | 369/44.32 |
| 5,446,710 | 8/1995 | Gardner et al. | 369/112 |

*Primary Examiner*—Georgia Y. Epps
*Assistant Examiner*—Kim-Kwok Chu
*Attorney, Agent, or Firm*—Fitzpatrick, Cella, Harper & Scinto

[57] ABSTRACT

An optical recording and/or reproducing apparatus comprises a light source, a beam splitter located between the light source and an optical recording medium, the beam splitter comprising a first prism and a second prism, a first photosensor for control of light quantity of the light source, and a second photosensor for reproduction of information from the recording medium. The first prism has a first face, a second face, a third face, and a fourth face while the second prism has a fifth face, a sixth face, and a seventh face. The fourth face and the seventh face of the prisms are bonded to each other. The first photosensor is arranged to receive a beam emitted from the light source, entering the first face, reflected by the third face, reflected by the fourth face, reflected by the first face, and then outgoing from the second face. The second photosensor is arranged to receive a beam emitted from the light source, entering the first face, reflected by the third face, passing through the fourth face, outgoing from the fifth face toward the optical recording medium, reflected by the optical recording medium to enter the fifth face, reflected by the seventh face, and then outgoing from the sixth face.

16 Claims, 7 Drawing Sheets

OPTICAL RECORDING AND/OR REPRODUCING APPARATUS INCLUDING A TWO PRISM BEAM SPLITTER FOR SIZE REDUCTION

BACKGROUND OF THE INVENTION

1. Field of the Invention

The present invention relates to an optical recording and/or reproducing apparatus which focuses a beam from a light source for an optical disk or the like in the form of a fine optical spot on an optical recording medium to record and/or reproduce information. More particularly, the invention relates to the shape and optical layout of a beam splitter in a fixed optical unit in a separate optical system in which a light source portion and photosensors are stationary and only optical elements such as an objective lens and a reflection mirror are mounted in a movable unit to be moved in the direction of a disk radius.

2. Related Background Art

Recently, optical memories for recording and/or reproducing information with a semiconductor laser beam have vigorously been introduced commercially as a high density recording memory. Especially, magneto-optical recording and/or reproducing apparatus in which information is rewritable are considered to be promising. The magneto-optical recording and/or reproducing apparatus magnetically record information utilizing a local temperature rise in a magnetic thin film upon irradiation in the form of a spot with a laser beam and reproduce the information by the magneto-optical effect (Kerr effect).

Here, described is an optical system for an optical head in the magneto-optical recording and/or reproducing apparatus as having been proposed heretofore.

In FIG. 1, a beam from a semiconductor laser 1 is collimated by a collimator lens 2 and the thus collimated beam enters a polarization beam splitter 3. A plane of incidence of the polarization beam splitter 3 is inclined at a predetermined angle relative to the beam from the collimator lens 2, whereby the beam from the semiconductor laser 1 having an anisotropic light intensity distribution is shaped into a beam having an isotropic light intensity distribution. The direction of polarization of the beam from the semiconductor laser 1 is selected in the direction of an arrow 4. The beam passing through the polarization beam splitter 3 is focused as a fine optical spot on a magneto-optical disk 6 by an objective lens 5. An arrow 7 represents the direction of information tracks on the magneto-optical disk 6.

To keep the quantity of light from the semiconductor laser 1 constant, the apparatus performs such a feedback control that a photosensor 8 receives the beam not going to the magneto-optical disk 6 but reflected by the polarization beam splitter 3 and that an output from the sensor 8 is fed back to the semiconductor laser 1.

When the beam is reflected by the magneto-optical disk 6, the plane of polarization of the reflected beam is slightly rotated. The reflected beam again enters the objective lens 5 and then is reflected by the polarization beam splitter 3. The thus reflected beam enters a half wave plate 9, where the plane of polarization is rotated 45°. Then, a condenser lens 10 and a cylindrical lens 11 focus the beam on photosensors 13, 14.

Located before the photosensors 13, 14 is a polarization beam splitter 12, which transmits a component of p-polarized light toward the photosensor 13 and which reflects a component of s-polarized light toward the photosensor 14. Since the aforementioned rotation of the polarization plane is converted into a difference between quantities of light reaching the two photosensors 13, 14, a differential output thereof can provide a magneto-optical signal.

Also, the cylindrical lens 11 works to change the shape of the optical spots on the photosensors 13, 14 for detecting the magneto-optical signal in accordance with a focused state of the optical spot on the magneto-optical disk 6, whereby a focusing error signal can be obtained. Similarly, light intensity distributions of the optical spots on the photosensors 13, 14 change depending upon track deviation of the optical spot on the magneto-optical disk 6, whereby a tracking error signal can be obtained.

For recording information on the magneto-optical disk 6, a magnetic head 30 applies a magnetic field to a portion where the optical spot is focused by the objective lens 5, so as to record information.

Meanwhile, many of recently commercially available magneto-optical recording and/or reproducing apparatus employ an arrangement of a separate optical system in which the light source portion and photosensors are arranged to be stationary and only optical elements such as the objective lens and the reflection mirror are mounted in a movable unit to be moved in the direction of the disk radius, in order to reduce the time of access to a target information track.

An optical head employing the conventionally proposed separate optical system is next described with respect to FIG. 2. Elements having the same functions as those in FIG. 1 are denoted by the same reference numerals.

The optical head in FIG. 2 is composed of an optical system movable unit 16 and an optical system stationary unit 18. An optical system of the movable unit is light in weight and compact as being composed of a reflection mirror 15, an objective lens 5, and focusing and tracking actuators, and designed as to give access to a target information track within a short time. The movable unit is actually so arranged as to be rotated 90° about the optical axis perpendicular to the arrow 7 representing the direction of information tracks on the magneto-optical disk 6.

Now, for apparatus using a magneto-optical disk with a diameter of 90 mm, the stationary unit 18 also needs to be constructed in a compact structure because of the limit of dimensions of the apparatus. Thus, the beam collimated by the collimator lens 2 is arranged to be reflected by a mirror 17 to enter the polarization beam splitter 3. By this arrangement, the length of the stationary optical system along the radial direction of the disk can be made shorter to some extent than that of the optical system shown in FIG. 1.

Nevertheless, the semiconductor laser 1 and the photosensor 8 are juxtaposed in the radial direction of the disk, which makes it difficult to further decrease the length of the stationary unit 18. It is similarly difficult in the case with such an arrangement that the mirror 17 is inverted and the semiconductor laser 1 is arranged in the same direction as the photosensors 13, 14.

Further, if the separate optical system should be so arranged that the beam emitted from the stationary unit 18 and then reaching the movable unit 16 was not in parallel with the radial direction of the disk, a tracking offset would occur with movement of the movable unit 16. Thus, the system needs a mechanism for adjusting an inclination of the mirror 17, which is against a desire to make the stationary unit more compact and also raises the production cost.

SUMMARY OF THE INVENTION

The present invention has been accomplished taking the above-described drawbacks in the conventional examples into consideration, and an object of the present invention is to provide an optical recording and/or reproducing apparatus smaller in apparatus size as a whole by making the optical system stationary unit in the separate optical system more compact.

To achieve the above object, the present invention involves the following arrangement for a beam splitter provided between a light source and an optical recording medium in an optical recording and/or reproducing apparatus.

A beam splitter of the present invention comprises a first prism and a second prism, wherein the first prism has a first face, a second face, a third face, and a fourth face and the second prism has a fifth face, a sixth face, and a seventh face and wherein the fourth face and the seventh face of the prisms are bonded to each other.

A beam emitted from a light source, incident into the first face, reflected by the third face, reflected by the fourth face, reflected by the first face, and then outgoing from the second face is incident into a first photosensor for controlling a quantity of light of the light source.

The beam emitted from the light source, incident into the first face, reflected by the third face, passing through the fourth face, and then outgoing from the fifth face is directed to an optical recording medium.

A return beam from the optical recording medium reflected by the optical recording medium is incident into the fifth face, is reflected by the seventh face, and is outgoing from the sixth face to enter a second photosensor for reproducing information from the optical recording medium.

DETAILED DESCRIPTION OF THE PREFERRED EMBODIMENTS

Figure 3:
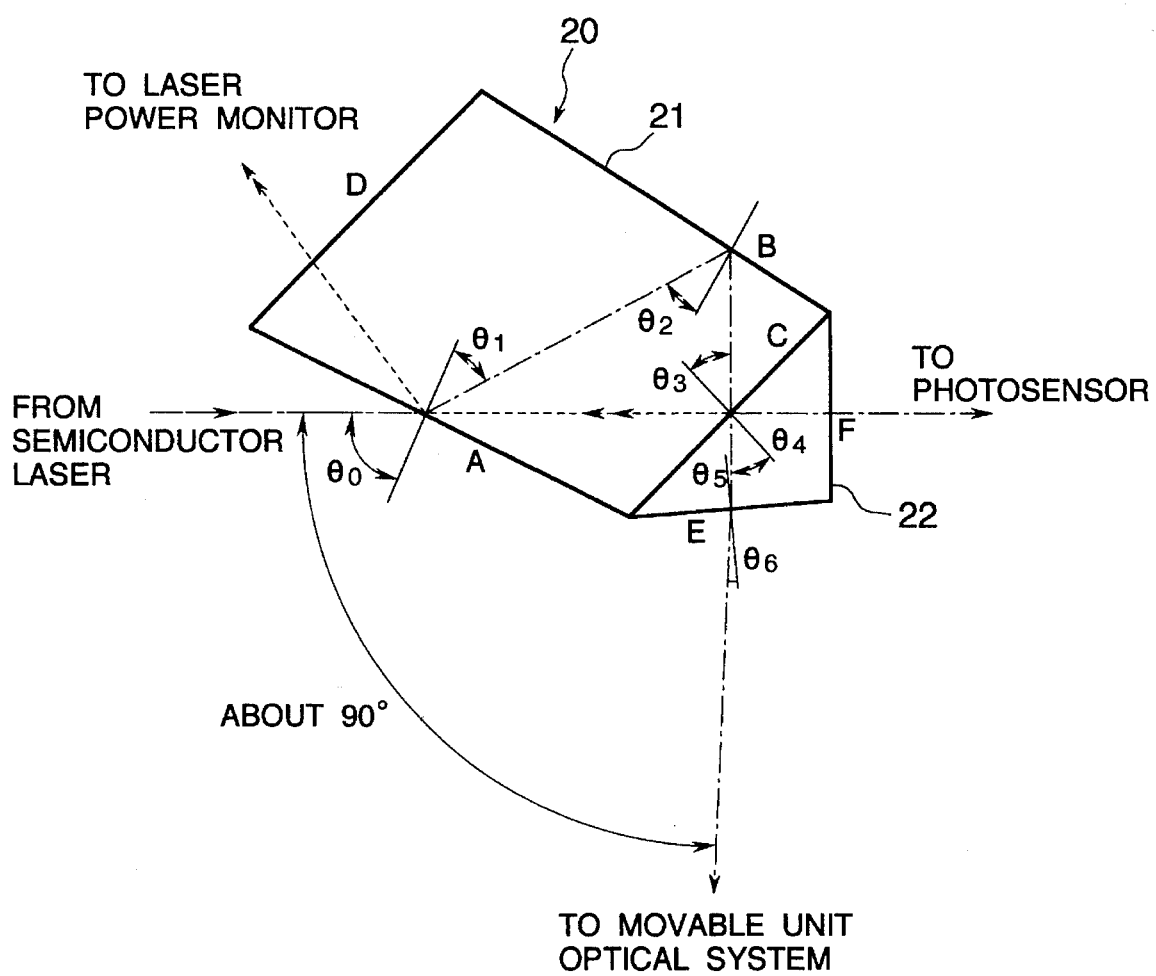
FIG. 3 is an explanatory drawing to illustrate a polarization beam splitter with a beam shaping function according to the present invention.

FIG. 3 shows the structure of a polarization beam splitter 20 with a beam shaping function according to the present invention. The polarization beam splitter 20 of the present invention is composed of a quadrilateral prism 21 (first prism) and a triangular prism 22 (second prism), bonded to each other.

The first prism has a first face (A), a second face (D), a third face (B), and a fourth face (C), while the second prism has a fifth face (E), a sixth face (F), and a seventh face (C).

A polarization beam splitter surface is formed on the fourth and seventh bonded faces (C).

A beam from a semiconductor laser 1 having an anisotropic light intensity distribution is collimated by a collimator lens 2 and the thus collimated beam enters an incident surface A (first face) of the quadrilateral prism 21. The incident surface A is covered with an anti-reflection coating for the beam from the semiconductor laser 1. The beam is refracted at the incident surface A to become a beam having an approximately isotropic light intensity distribution. The thus converted beam is internally reflected by the reflection surface B (third face) and the reflected beam is incident into the polarization beam splitter surface C. The beam passing through the polarization beam splitter surface C (as represented by a chain line in the drawing) is then incident into the triangular prism 22, and is outgoing from the surface E (fifth face) toward an optical system movable unit to be directed to a magneto-optical disk 6.

The triangular prism 22 may be of a right-angled isosceles triangle, but the present embodiment employs one having a predetermined angle inclined in order to prevent stray light through the face E from directly reaching the photosensors 13, 14. The beam splitter is so arranged that the outgoing beam from the surface E makes an angle of about 90° with the incident beam from the semiconductor laser 1.

The beam reflected by the magneto-optical disk 6 enters the triangular prism 22 through the surface E and then is reflected by the polarization beam splitter 10 surface C. Characteristics of the polarization beam splitter surface C are so selected that the reflectivity of p-polarized light is 15 to 30% and the reflectivity of s-polarized light is about 100%.

Using the polarization beam splitter with such characteristics, the beam from the semiconductor laser 1 can be effectively utilized in the forward path while the angle of Kerr rotation can be amplified in the backward path to obtain a magneto-optical signal with good S/N. The beam reflected by the polarization beam splitter surface C is outgoing from the surface F (sixth face) and is guided toward the photosensor 13 or 14 (second photosensor) for reproducing the information.

As is apparent from FIG. 3, using the polarization beam splitter 20 with a beam shaping function according to the present invention, the optical path of the beam from the semiconductor laser 1 into the polarization beam splitter 20 and the optical path of the beam from the polarization beam splitter 20 to the photosensors 13, 14 can be arranged substantially on a straight line.

Among the beams entering the incident surface A (first face) of the quadrilateral prism 21 to be refracted, thereafter internally reflected by the reflection surface B, and then entering the polarization beam splitter surface C, a portion reflected toward a photosensor 8 (first photosensor) for monitoring laser power is next described.

The beam reflected by the polarization beam splitter surface C (represented by a dotted line in the drawing) is totally reflected by the incident plane A of the beam from the semiconductor laser 1 so as to be directed from the surface D (second face) to the photosensor 8 for monitoring the laser power. An angle of incidence into the incident surface A differs more or less depending upon a beam shaping ratio. The angle of incidence becomes at least 60° for beam shaping ratios being 2 or more. In that case, the beam is totally reflected irrespective of whether the coating film is present or absent on the incident surface A or how the coating film is constructed.

The embodiment of the present invention will be described in further detail. The quadrilateral prism 21 and the triangular prism 22 are made of respective glass materials different from each other and are so arranged that the beam can be directed at a constant angle toward the optical system movable unit even though the wavelength of the semiconductor laser 1 changes because of a change in environment temperature or a change in laser power.

For example, the quadrilateral prism 21 is made of BSL 7 (from the catalog of Kabushiki Kaisha OHARA Kogaku Glass), the triangular prism 22 is made of PBL 25 (from the catalog of Kabushiki Kaisha OHARA Kogaku Glass), an angle of incidence into and an angle of exit from the surface A are $\theta 0$ and $\theta 1$, respectively, an angle of incidence into the surface B is $\theta 2$, an angle of incidence into and an angle of refraction from the surface C are $\theta 3$ and $\theta 4$, respectively, an angle of incidence into and an angle of refraction from the surface E are $\theta 5$ and $\theta 6$, respectively, the beam shaping ratio is 2.0, an apex angle of the isosceles triangle prism 22 is 94°, and designed wavelengths are $\lambda$=785 to 800 nm.

|  |  | $\lambda$ = 785 nm | $\lambda$ = 800 nm |
|---|---|---|---|
| Refr. Index of Glass | BSL 7 | n = 1.51062 | n = 1.51032 |
|  | PBL 25 | n = 1.57203 | n = 1.57157 |
| Angle of Incidence/ Reflection/refraction | $\theta 0$ | 65.415° | 65.415° |
|  | $\theta 1$ | 37.011° | 37.020° |
|  | $\theta 2$ | 30.004° | 30.012° |
|  | $\theta 3$ | 46.589° | 46.581° |
|  | $\theta 4$ | 44.272° | 44.269° |
|  | $\theta 5$ | 1.272° | 1.269° |
|  | $\theta 6$ | 2.000° | 1.995° |

As seen from the above table, the angle of exit toward the optical system movable unit changes at most only about 0.005° even with the change in wavelength of semiconductor laser 1 in the range of $\lambda$=785 to 800 nm, so that a focusing error and a tracking error due to deviation of the optical axis can be substantially ignored.

Figure 1:
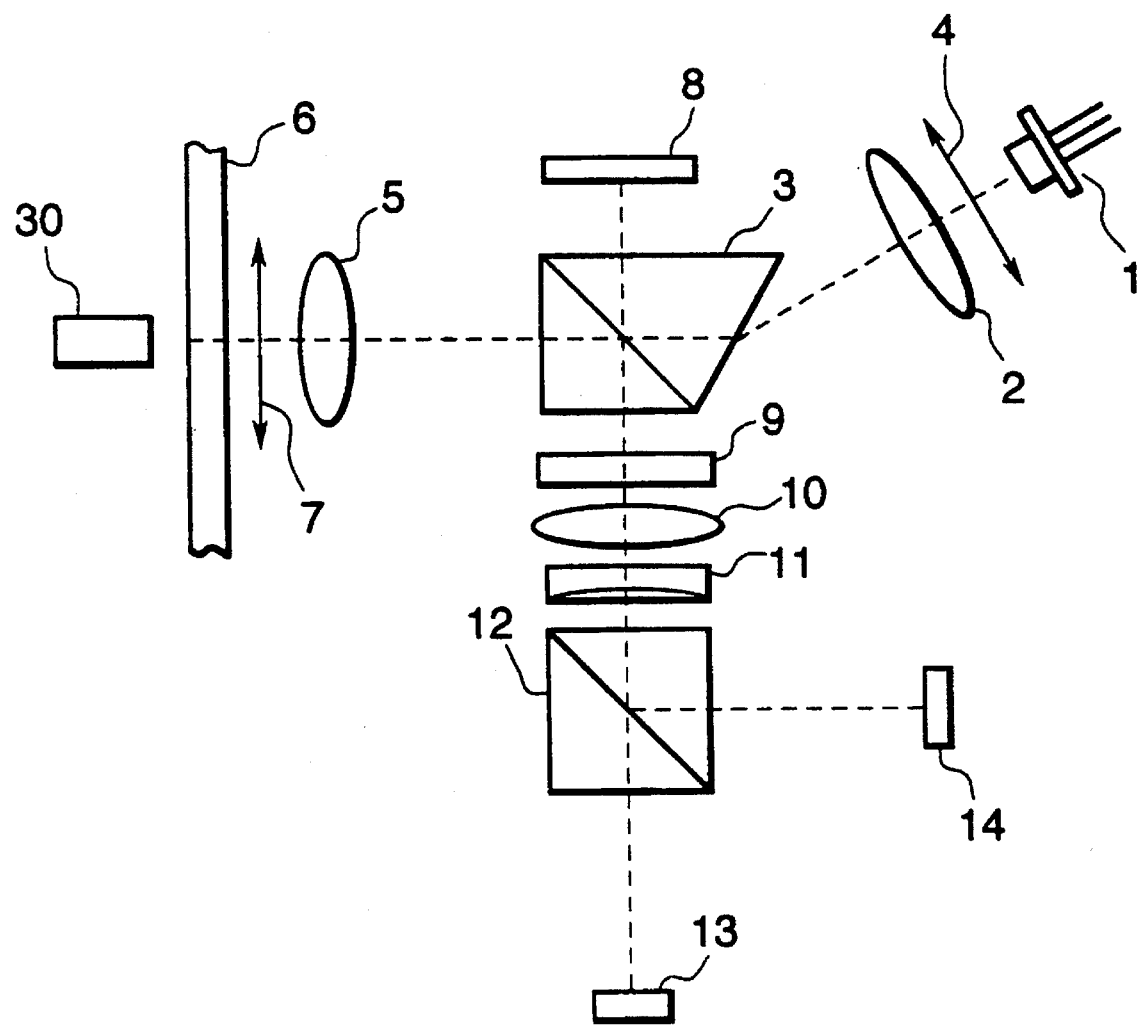
FIG. 1 is an explanatory drawing to illustrate a magneto-optical recording and/or reproducing apparatus as conventionally proposed.
Figure 2:
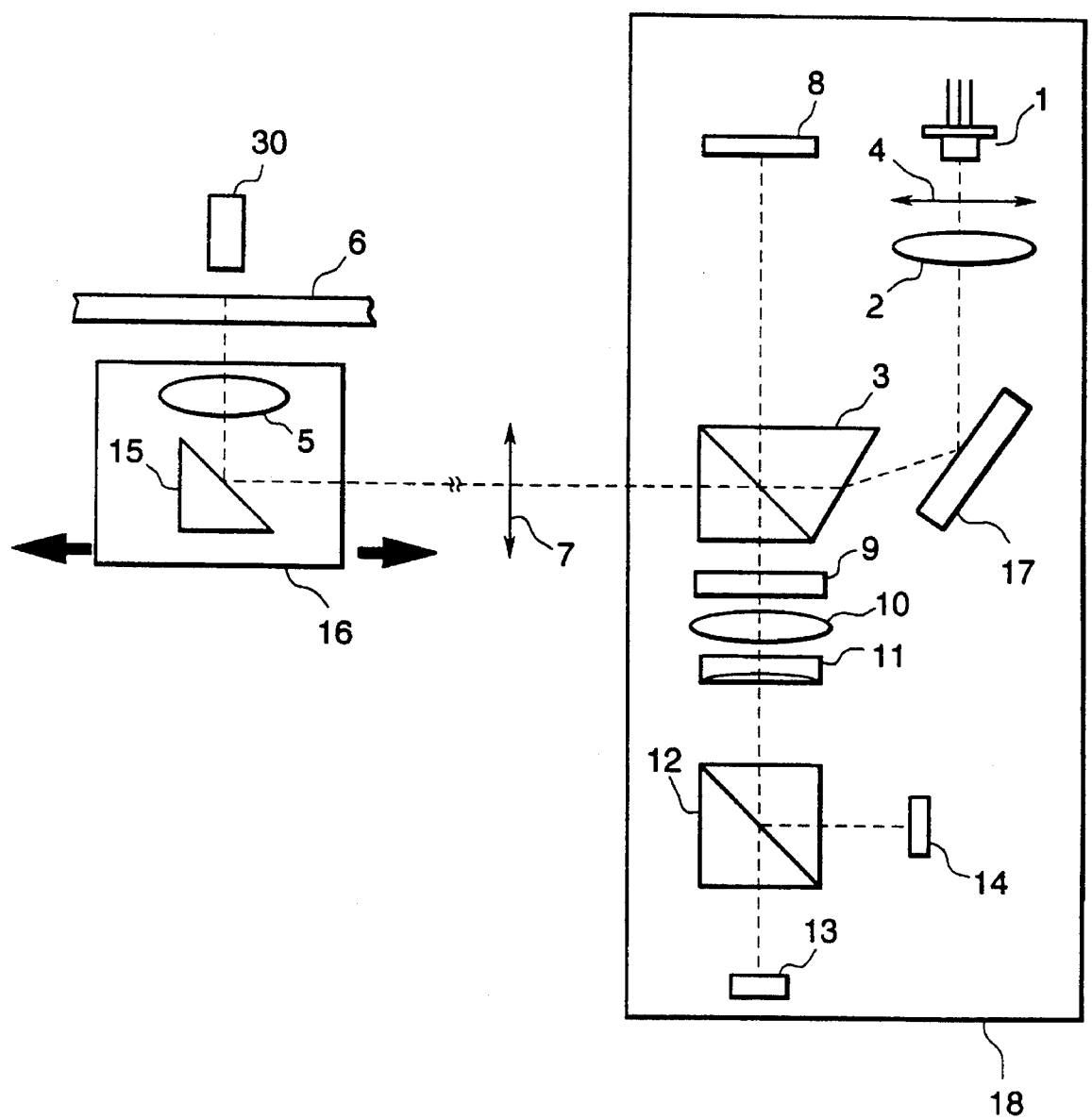
FIG. 2 is an explanatory drawing to show an optical head using a separate optical system as conventionally proposed.
Figure 4:
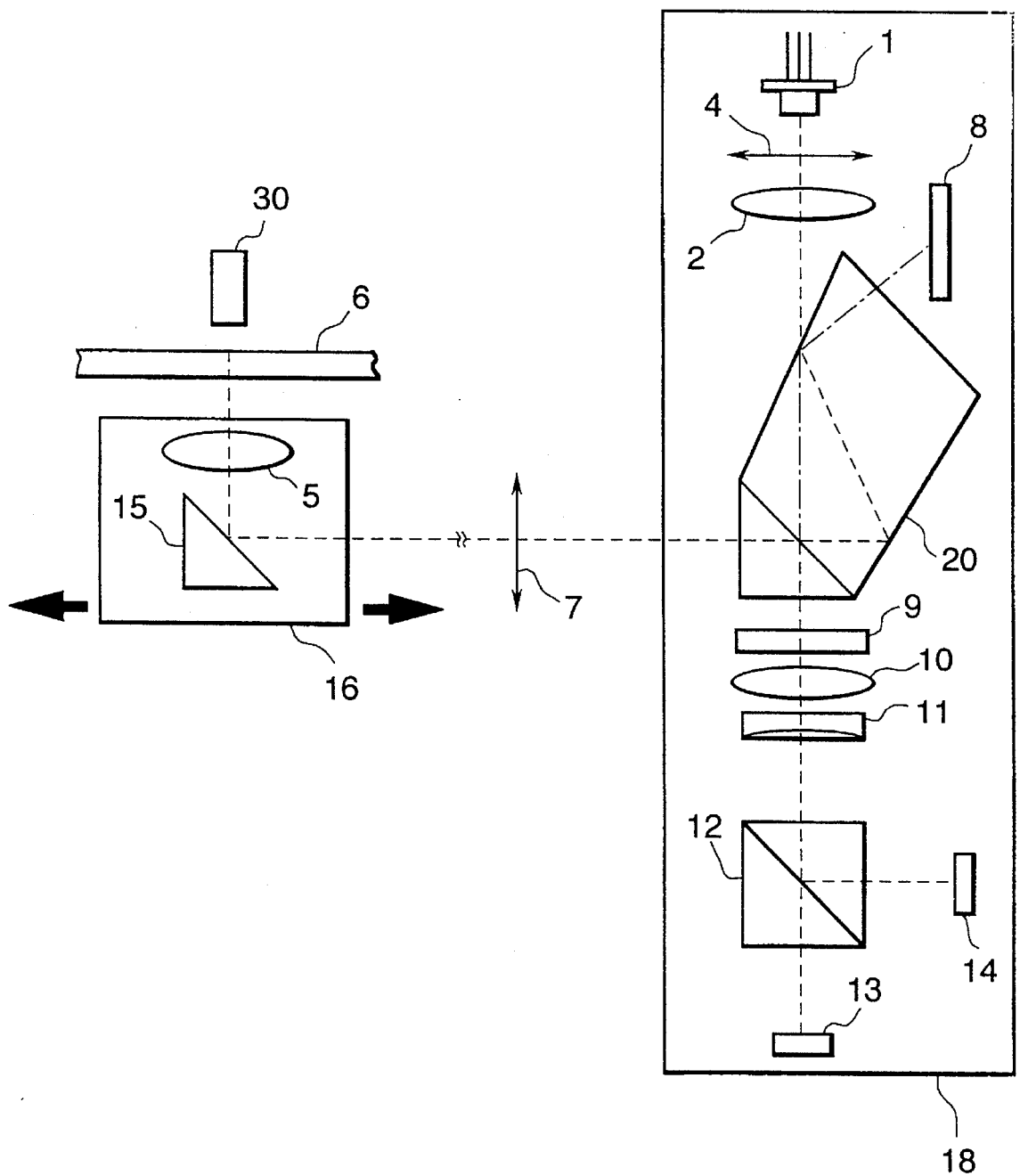
FIG. 4 is an explanatory drawing to illustrate a magneto-optical recording and/or reproducing apparatus using the polarization beam splitter with a beam shaping function according to the present invention.

FIG. 4 illustrates a magneto-optical recording and/or reproducing apparatus using the polarization beam splitter 20 with a beam shaping function according to the present invention. FIG. 4 shows an optical head utilizing the separate optical system as shown in FIG. 2. Elements having the same functions as those in FIG. 1 and FIG. 2 are denoted by the same reference numerals and explanation thereof is omitted herein. It should be noted that the optical system movable unit in FIG. 4 is actually arranged to be rotated 90° about the optical axis perpendicular to the arrow 7 representing the direction of information tracks on the magneto-optical disk 6.

The optical head in FIG. 4 is composed of an optical system movable unit 16 and an optical system stationary unit 18. The movable unit 16 is light in weight and compact as being composed of a reflection mirror 15, an objective lens 5, and focusing and tracking actuators for the objective lens 5, and designed to give access to a target information track within a short time.

Also, the stationary unit 18 employs the polarization beam splitter 20 with a beam shaping function according to the present invention, whereby the length of the stationary portion in the radial direction of the disk can be considerably decreased as compared with the conventional examples.

Since the beam for monitoring the laser power is outgoing in the oblique direction from the polarization beam splitter 20 with respect to the beam from the semiconductor laser 1, the semiconductor laser 1 and the photosensor 8 can be set in a compact arrangement. The photosensor 8 is set to be inclined relative to the incident beam thereinto, which is for preventing return light from the photosensor 8 from directly going back to the semiconductor laser 1, thereby in turn preventing unstable operation of the laser.

To make parallel the beam outgoing from the stationary unit 18 and then reaching the movable unit 16 with the radial direction of the disk, it is necessary to control bonding accuracy of the polarization beam splitter 20.

Since the bonding accuracy can be easily enhanced because the polarization beam splitter 20 has a relatively long surface such as the incident surface A, the apparatus has no need for the inclination adjusting mechanism like the mirror 17 in the conventional example. Also, since the glass component is composed of a component without the adjusting mechanism, the apparatus is unlikely to cause the deviation of the optical axis.

Figure 5:
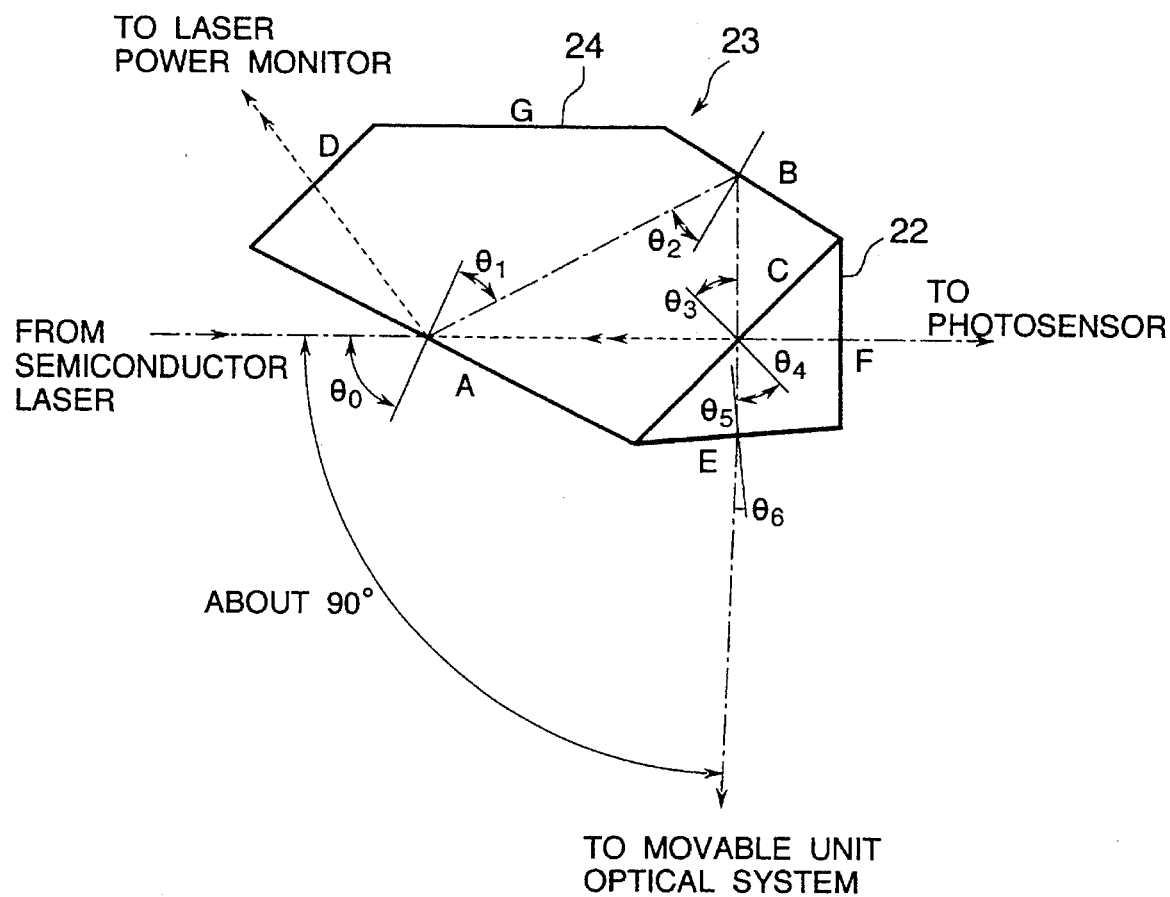
FIG. 5 is an explanatory drawing to illustrate another embodiment of the present invention.

FIG. 5 illustrates another embodiment of polarization beam splitter 23 with a beam shaping function according to the present invention. The polarization beam splitter 23 is composed of a pentagonal prism 24 and the triangular prism 22. Elements having the same functions as those in FIG. 3 are denoted by the same reference numerals and explanation thereof is omitted herein. The pentagonal prism 24 is one obtained by cutting the quadrilateral prism 21 in FIG. 3 so as to remove a portion where no beam passes. This shape can further decrease the size of the stationary optical system in the radial direction of the disk in the optical system.

In the embodiments shown in FIG. 3 to FIG. 5, the face A (first face) can be made parallel while the face B (third face) and the face C (fourth face) can be made parallel with the face D (second face) in the quadrilateral prism 21 or in the pentagonal prism 24. By making these faces parallel with each other, both the faces can be simultaneously polished in polishing the component, which can reduce steps in production. In order to make parallel the face A with the face B, there is some restriction on a combination of the beam shaping ratio and the glass materials. In contrast, there is no restriction as to the face C and the face D. The effect of cost reduction can be of course enjoyed with either one of the pairs being made parallel.

Figure 6:
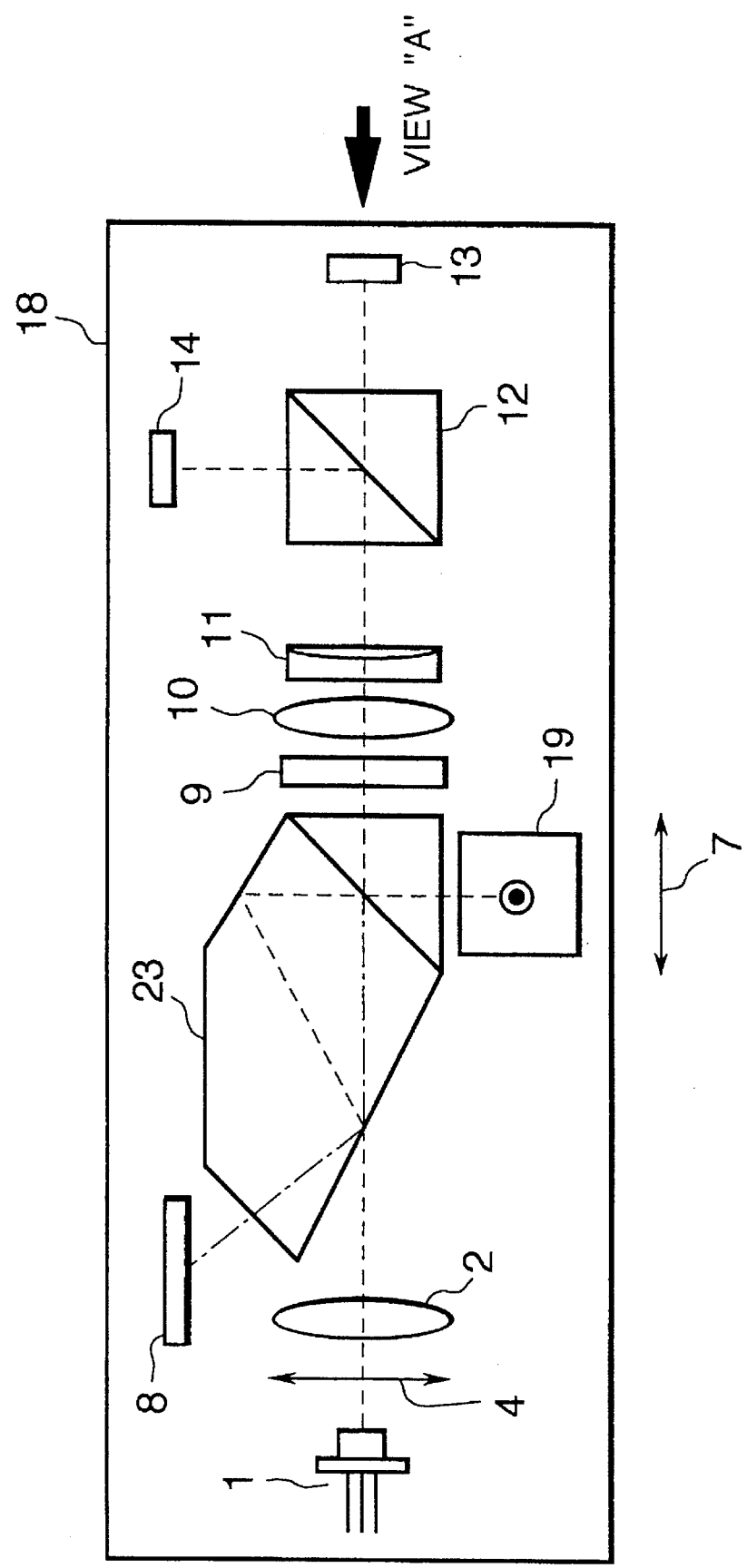
FIG. 6 is an explanatory drawing to illustrate another magneto-optical recording and/or reproducing apparatus using the polarization beam splitter with a beam shaping function according to the present invention.
Figure 7:
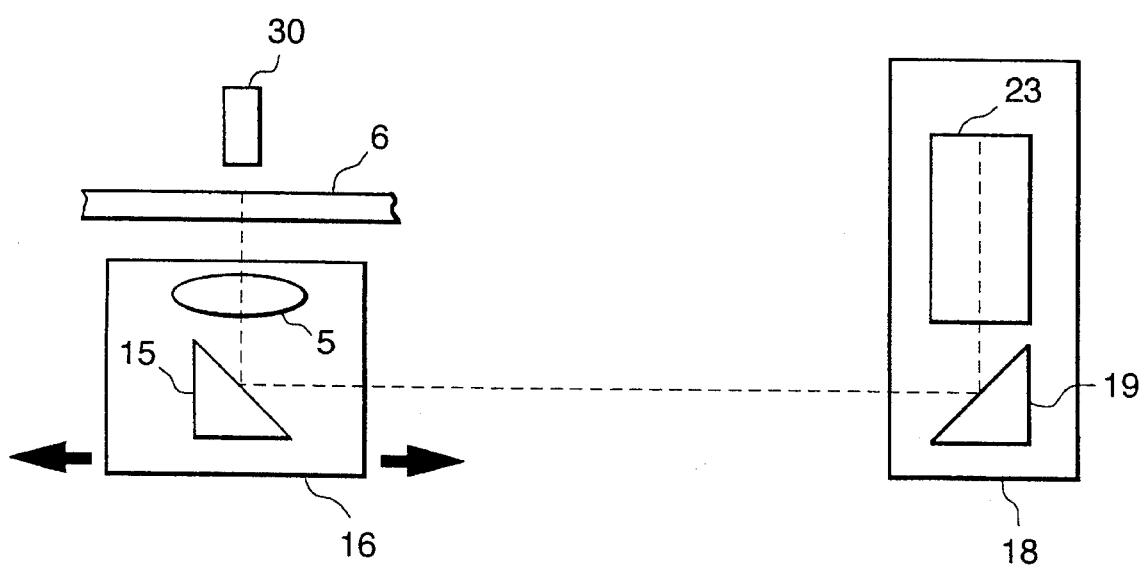
FIG. 7 is an explanatory drawing to illustrate another magneto-optical recording and/or reproducing apparatus using the polarization beam splitter with a beam shaping function according to the present invention.

FIG. 6 and FIG. 7 illustrate a magneto-optical recording and/or reproducing apparatus using the polarization beam splitter 23 with beam a shaping function according to the present invention. FIG. 6 shows an optical head using the separate optical system as shown in FIG. 2. Elements having the same functions as those in FIG. 1 and FIG. 2 are denoted by the same reference numerals and explanation thereof is omitted herein. FIG. 6 is a front view of an optical system stationary unit and FIG. 7 is a side view (a view as observed along arrow A) of the stationary unit, in which the arrow 7 represents the direction of information tracks on the magneto-optical disk 6.

The stationary unit in FIG. 6 and FIG. 7 is one obtained by arranging the stationary unit in FIG. 4 perpendicular to the plane of the drawing, in which a mirror 19 is added to bend the optical path.

Since the polarization beam splitter 23 of the present invention is constructed in the compact structure also in the height direction of FIG. 5, the length of the stationary unit in the radial direction of the disk can be further decreased by such an arrangement at the end portion of an optical disk recording and/or reproducing apparatus. This arrangement is effective especially for cases where the optical path between the movable unit 16 and the stationary unit 18 is to be set at a low position.

Although the above description of the invention is concerned with the magneto-optical recording and/or reproducing apparatus, the present invention can be applicable to other high density optical memory apparatus as well.

As detailed above, the optical system stationary unit in the separate optical system employs the polarization beam splitter with a beam shaping function according to the present invention, whereby the length of the stationary optical system in the radial direction of the disk can be considerably decreased as compared with that in the conventional examples.

This is true because the optical path from the semiconductor laser to the polarization beam splitter and the optical path from the polarization beam splitter to the photosensors for reproducing information are arranged substantially on a straight line. Also, since the beam for monitoring the laser power is outgoing from the polarization beam splitter in the oblique direction relative to the beam from the semiconductor laser, the semiconductor laser and the photosensors for monitoring the laser power can be set in a compact arrangement.

Further, the bonding accuracy of the polarization beam splitter can be easily controlled, so that the apparatus has no need for the inclination adjusting mechanism. Also, since the glass component is constructed of a component without an adjusting mechanism, the apparatus has advantages of being unlikely to cause the deviation of the optical axis.

What is claimed is:

1. An optical recording and/or reproducing apparatus comprising:

a light source;

a beam splitter located between said light source and an optical recording medium, said beam splitter comprising a first prism and a second prism, said first prism having a first face, a second face, a third face, and a fourth face and said second prism having a fifth face, a sixth face, and a seventh face, wherein said fourth face and said seventh face of said first and second prisms are bonded to each other;

a first photosensor for controlling a quantity of light from said light source by receiving a beam emitted from said light source, entering said first face, reflected by said third face, reflected by said fourth face, reflected by said first face, and then outgoing from said second face to said first photosensor; and a second photosensor for reproducing information from the optical recording medium by receiving a beam emitted from said light source, entering said first face, reflected by said third face, passing through said fourth face, outgoing from said fifth face toward said optical recording medium, reflected by said optical recording medium to enter said fifth face, reflected by said seventh face, and then outgoing from said sixth face to said second photosensor.

2. The apparatus according to claim 1, wherein said first face and said third face are parallel to each other.

3. The apparatus according to claim 1, wherein said second face and said fourth face are parallel to each other.

4. The apparatus according to claim 1, wherein said light source is a semiconductor laser having an anisotropic light intensity distribution and wherein a beam therefrom entering said first face is refracted to be converted into a beam having an approximately isotropic light intensity distribution.

5. The apparatus according to claim 1, wherein a joint surface where said fourth face and said seventh face are bonded to each other has a beam splitter function.

6. The apparatus according to claim 1, wherein a joint surface where said fourth face and said seventh face are bonded to each other has a polarization beam splitter function.

7. The apparatus according to claim 1, wherein said third face is an internal reflection surface.

8. The apparatus according to claim 1, wherein an optical path of the beam emitted from said light source toward said first face and an optical path of the beam outgoing from said sixth face toward said second photosensor are arranged substantially on a straight line.

9. A magneto-optical recording and/or reproducing apparatus comprising:

a magnetic head for applying a magnetic field to a magneto-optical recording medium;

a light source;

a beam splitter located between said light source and the magneto-optical recording medium, said beam splitter comprising a first prism and a second prism, said first prism having a first face, a second face, a third face, and a fourth face and said second prism having a fifth face, a sixth face, and a seventh face, wherein said fourth face and said seventh face are bonded to each other;

a first photosensor for controlling a quantity of light from said light source by receiving a beam emitted from said light source, entering said first face, reflected by said third face, reflected by said fourth face, reflected by said first face, and then outgoing from said second face to said first photosensor; and a second photosensor for reproducing information from the magneto-optical recording medium by receiving a beam emitted from said light source, entering said first face, reflected by said third face, passing through said fourth face, outgoing from said fifth face toward the magneto-optical recording medium, reflected by the magneto-optical recording medium to enter said fifth face, reflected by said seventh face, and then outgoing from said sixth face to said second photosensor.

10. The apparatus according to claim 9, wherein said third face is an internal reflection surface.

11. The apparatus according to claim 9, wherein an optical path of the beam emitted from said light source toward said first face and an optical path of the beam outgoing from said sixth face toward said second photosensor are arranged substantially on a straight line.

12. The apparatus according to claim 9, wherein said first face and said third face are parallel to each other.

13. The apparatus according to claim 9, wherein said second face and said fourth face are parallel to each other.

14. The apparatus according to claim 9, wherein said light source is a semiconductor laser having an anisotropic light intensity distribution and wherein a beam therefrom entering said first face is refracted to be converted into a beam having an approximately isotropic light intensity distribution.

15. The apparatus according to claim 9, wherein a joint surface where said fourth face and said seventh face are bonded to each other has a beam splitter function.

16. The apparatus according to claim 9, wherein a joint surface where said fourth face and said seventh face are bonded to each other has a polarization beam splitter function.

* * * * *

UNITED STATES PATENT AND TRADEMARK OFFICE
CERTIFICATE OF CORRECTION

PATENT NO. : 5,546,373
DATED : August 13, 1996
INVENTOR(S) : OSAMU KOYAMA

It is certified that error appears in the above-indentified patent and that said Letters Patent is hereby corrected as shown below:

COLUMN 6:

Line 48, "beam a" should read --a beam--.

Signed and Sealed this

Thirty-first Day of December, 1996

*Attest:*

BRUCE LEHMAN

*Attesting Officer*      *Commissioner of Patents and Trademarks*